US008112793B2

(12) United States Patent
Kuribara

(10) Patent No.: US 8,112,793 B2
(45) Date of Patent: Feb. 7, 2012

(54) IMAGE FORMING APPARATUS AND IMAGE FORMING SYSTEM

(75) Inventor: Nobuhiro Kuribara, Fukushima (JP)

(73) Assignee: Oki Data Corporation, Tokyo (JP)

( * ) Notice: Subject to any disclaimer, the term of this patent is extended or adjusted under 35 U.S.C. 154(b) by 925 days.

(21) Appl. No.: 11/351,582

(22) Filed: Feb. 10, 2006

(65) Prior Publication Data

US 2006/0181729 A1 Aug. 17, 2006

(30) Foreign Application Priority Data

Feb. 15, 2005 (JP) ................................ 2005-037647

(51) Int. Cl.
*G06F 7/04* (2006.01)
(52) U.S. Cl. ............... 726/9; 726/20; 713/168; 713/169; 713/170; 713/171; 713/172; 713/173; 713/174; 713/182; 713/183; 713/184; 713/185; 713/186; 709/225; 709/229
(58) Field of Classification Search .................. 713/176, 713/182–186, 168–174, 179, 155–158; 382/100, 382/135, 232; 380/54, 200, 30, 217, 137; 726/2, 27–30, 9, 16–20; 348/552; 705/58; 709/225, 229
See application file for complete search history.

(56) References Cited

U.S. PATENT DOCUMENTS

| 5,694,471 | A | * | 12/1997 | Chen et al. ....................... 705/76 |
| 5,963,340 | A | * | 10/1999 | Kim ................................. 358/440 |
| 7,222,240 | B2 | * | 5/2007 | Elteto ............................ 713/185 |
| 2003/0068045 | A1 | * | 4/2003 | Foth ............................... 380/270 |
| 2003/0234951 | A1 | | 12/2003 | Lewis et al. |
| 2004/0049684 | A1 | * | 3/2004 | Nomura et al. ................ 713/182 |
| 2005/0068547 | A1 | * | 3/2005 | Negishi et al. ................. 358/1.1 |

FOREIGN PATENT DOCUMENTS

| EP | 0577013 A2 | 1/1994 |
| EP | 1357455 A2 | 10/2003 |
| EP | 1560109 A1 | 8/2005 |
| JP | 07068859 A | 3/1995 |
| WO | 2004042550 A1 | 5/2004 |

OTHER PUBLICATIONS

European Office Action for the related European Application No. 06101639.0 dated Jun. 18, 2010.
European Search Report dated Jun. 20, 2006.

* cited by examiner

*Primary Examiner* — Taghi Arani
*Assistant Examiner* — Josnel Jeudy
(74) *Attorney, Agent, or Firm* — Panitch Schwarze Belisario & Nadel LLP

(57) ABSTRACT

An image forming system includes a client apparatus and an image forming apparatus. The client apparatus includes an authentication data storing area defining section that produces an authentication data storing area in an external storage medium; a writing section that writes authentication data into the authentication data storing area; and an image data storing section that stores image data into the external storage medium. The image forming apparatus includes a searching section, an input section, an authenticating section, and an image processing section. The searching section reads authentication data from the external storage medium. Identification information is received from a user through the input section. The authenticating section performs authentication based on the identification information and the authentication data. The image processing section processes the image data. When the authentication has been established, the searching section reads image data from the external storage medium.

15 Claims, 12 Drawing Sheets

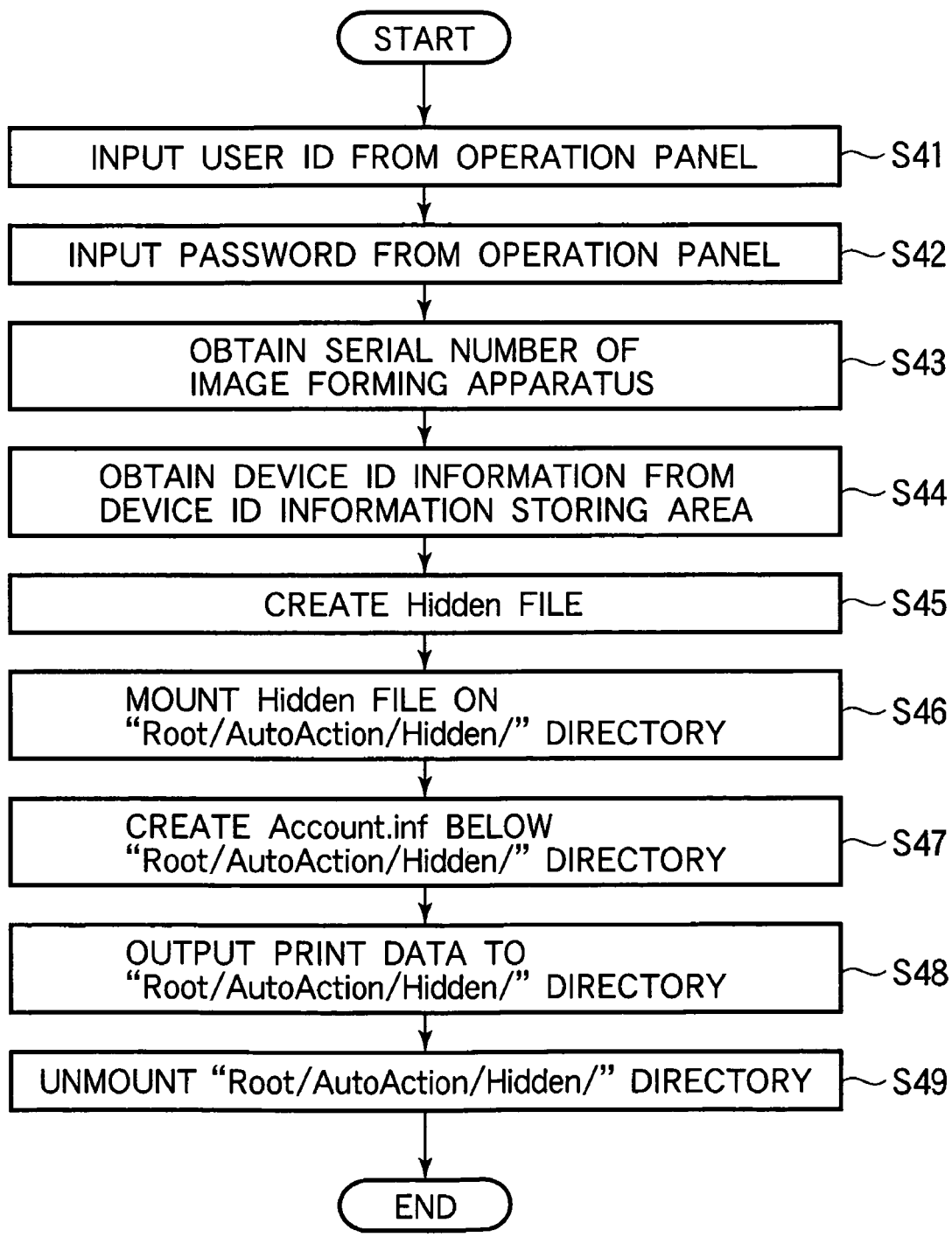

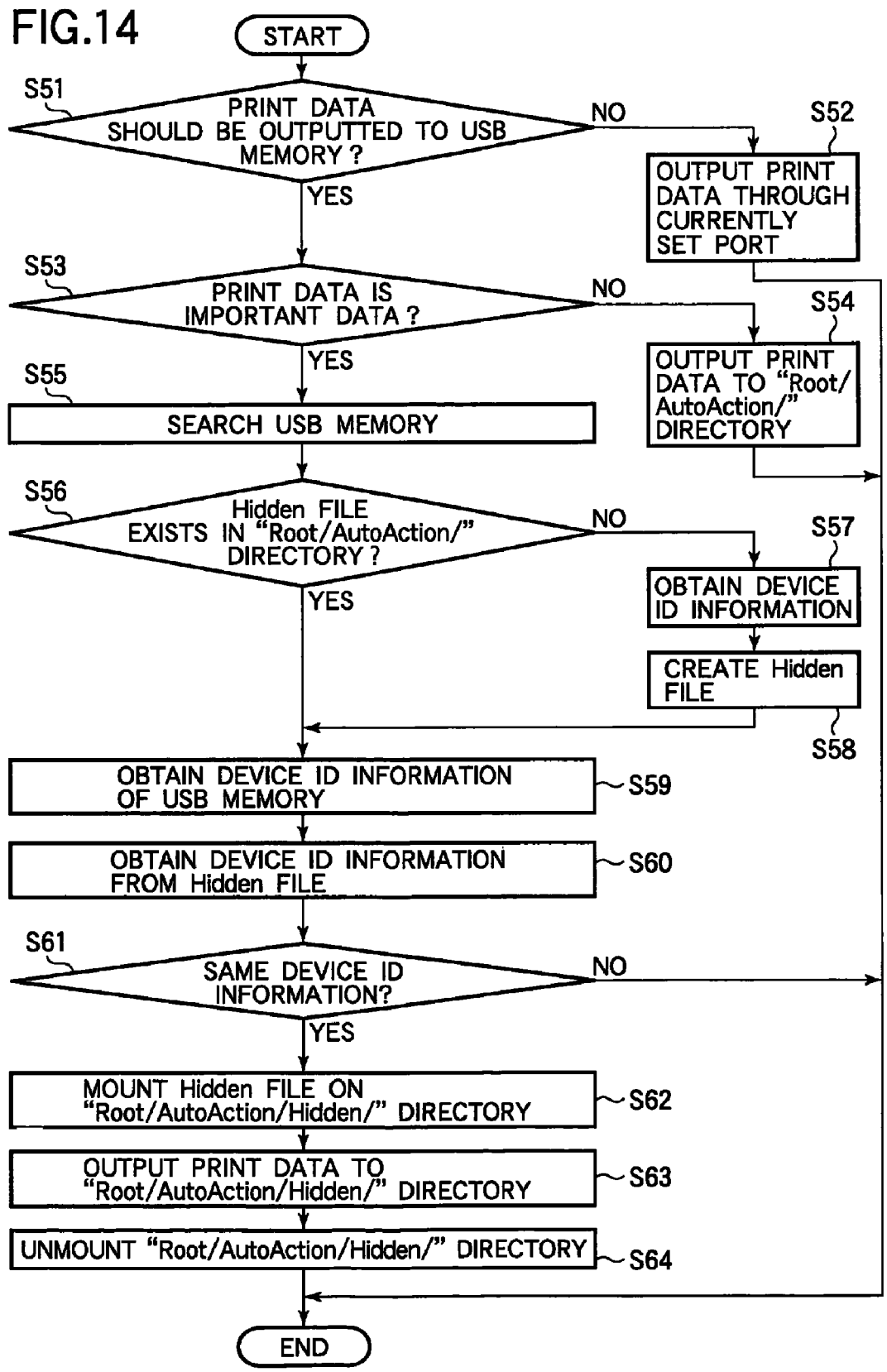

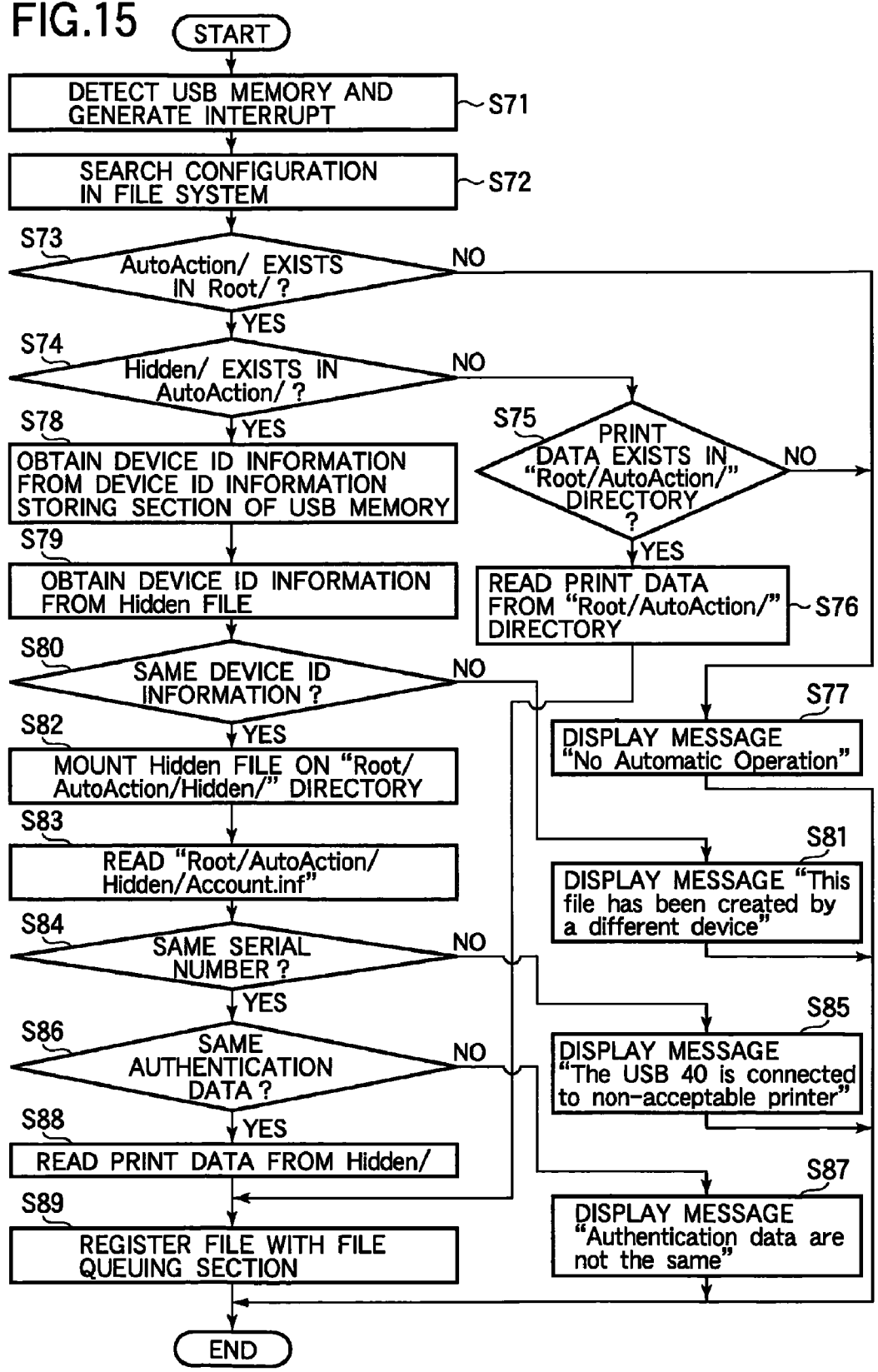

IMAGE FORMING APPARATUS AND IMAGE FORMING SYSTEM

BACKGROUND OF THE INVENTION

1. Field of the Invention

The present invention relates to an image forming apparatus and an image forming system.

2. Description of the Related Art

A conventional image forming apparatus is connected to an external storage medium such as a universal serial bus (USB) memory or a floppy disk. The image forming apparatus reads a file from the external storage medium, and prints the data contained in the file.

Once an external storage medium or apparatus has been connected to an image forming apparatus, the image forming apparatus is ready to print any file in the external storage medium or apparatus. This implies that all the files in the storage apparatus are available to anyone who attempts to print regardless of whether the files are important or confidential.

SUMMARY OF THE INVENTION

The present invention was made to solve the aforementioned drawback of the conventional image forming apparatus.

An object of the invention is to provide a high-security image forming apparatus and a high-security image forming system in which authentication is performed based on authentication data from an external storage medium and authentication data inputted by an operator, thereby preventing unauthorized personnel from accessing to and processing image data stored in the external storage medium.

An image forming apparatus includes a searching section, an input section, an authenticating section, and an image processing section. The searching section reads authentication data from an external storage medium detachably attached to the image forming apparatus. Identification information is received through the input section. The authenticating section performs authentication based on the identification information and the authentication data. The image processing section processes the image data. When the authentication has been established, the searching section reads image data from the external storage medium.

The external storage medium is a USB memory.

The image forming system further includes an authentication data producing section. The authentication data producing section produces the authentication data from second identification information that identifies the image forming apparatus. Then, the authentication data producing section sends the authentication data produced from the second identification information to the external storage medium. The authentication data is written into the external storage medium.

The image data is a file stored in a hidden file directory in the external storage medium.

The authentication data is read from the hidden file directory.

An image forming system includes a client apparatus and an image forming apparatus. The client apparatus includes an authentication data storing area defining section, a writing section, and an image data storing section. The authentication data storing area defining section produces an authentication data storing area in an external storage medium. The writing section writes authentication data into the authentication data storing area. The image data storing section stores image data onto the external storage medium. The image forming apparatus includes a searching section, an input section, an authenticating section, and an image processing section. The searching section reads authentication data from an external storage medium detachably attached to the image forming apparatus. Identification information is received from a user through the input section. The authenticating section performs authentication based on the identification information and the authentication data. The image processing section processes the image data. The searching section reads image data from the external storage medium when the authentication has been established.

The external storage medium includes a hidden file directory that stores a hidden file that contains the image data therein.

An image forming apparatus includes an authentication data storing area defining section, a writing section, a searching section, an input section, an authenticating section, and an image processing section. The authentication data storing area defining section defines an authentication data storing area in an external storage medium. The writing section writes authentication data into the authentication data storing area. The searching section reads authentication data from the external storage medium detachably attached to the image forming apparatus. Identification information is received through the input section. The authenticating section performs authentication based on the identification information and the authentication data. The image processing section processes the image data. When the authentication has been established, the searching section reads image data from the external storage medium.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 13 is a flowchart illustrating the operation in which the image forming apparatus produces authentication data;

FIG. 14 is a flowchart illustrating the operation in which the driver section outputs print data to the USB memory; and FIG. 15 is a flowchart illustrating the operation of the image forming apparatus when the USB memory is connected to the image forming apparatus.

DETAILED DESCRIPTION OF THE INVENTION

First Embodiment

{Configuration of Image Forming System}

The present invention will be described in detail with reference to the accompanying drawings.

Figure 1:
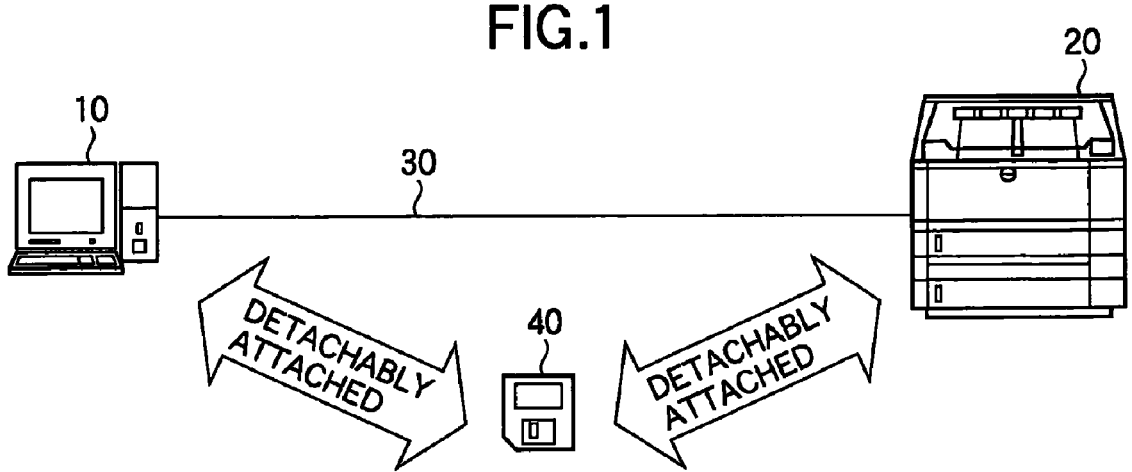
FIG. 1 illustrates the configuration of an image forming system according to a first embodiment.

FIG. 1 illustrates the configuration of an image forming system according to a first embodiment.

Referring to FIG. 1, the image forming system includes an image forming apparatus 20 and a client apparatus 10 that serves as a host apparatus (e.g., personal computer). The image forming apparatus 20 and client apparatus 10 are connected to each other through a bi-directional interface cable such as a USB cable or a Centronics interface cable, or via a communication line such as an intranet, local area network (LAN), or a network.

The image forming apparatus 20 of any known apparatus such as a facsimile machine provided with a communication function and is capable of printing print data received from the client apparatus 10 through a communication line 30. The embodiment will be described in terms of a printer. The image forming apparatus 20 may be of any type including an ink jet printer, electrophotographic printer, and thermal printer, and may be either a color printer or a monochrome printer. The client apparatus 10 takes the form of, for example, a server or a personal computer. The client apparatus 10 may be of any known types provided that the apparatus is capable of transmitting information to the image forming apparatus 20 through the communication line 30, sending a request to print to the image forming apparatus 20, accessing information stored in the image forming apparatus 20, and operating the image forming apparatus 20.

A USB memory 40 is an external storage medium that may be detachably attached to the client apparatus 10 and the image forming apparatus 20. A variety of types of external storage media including a Floppy Disk®, MO, DVD-RAM, and memory card may be used. Print data, control instructions, and file information take the forms of, for example, directory and files, and are stored in the USB memory 40.

{Configuration of Client Apparatus, Image Forming Apparatus, and USB Memory}

The configuration of the client apparatus 10, image forming apparatus 20 and USB memory 40 will be described in terms of function.

Figure 2:
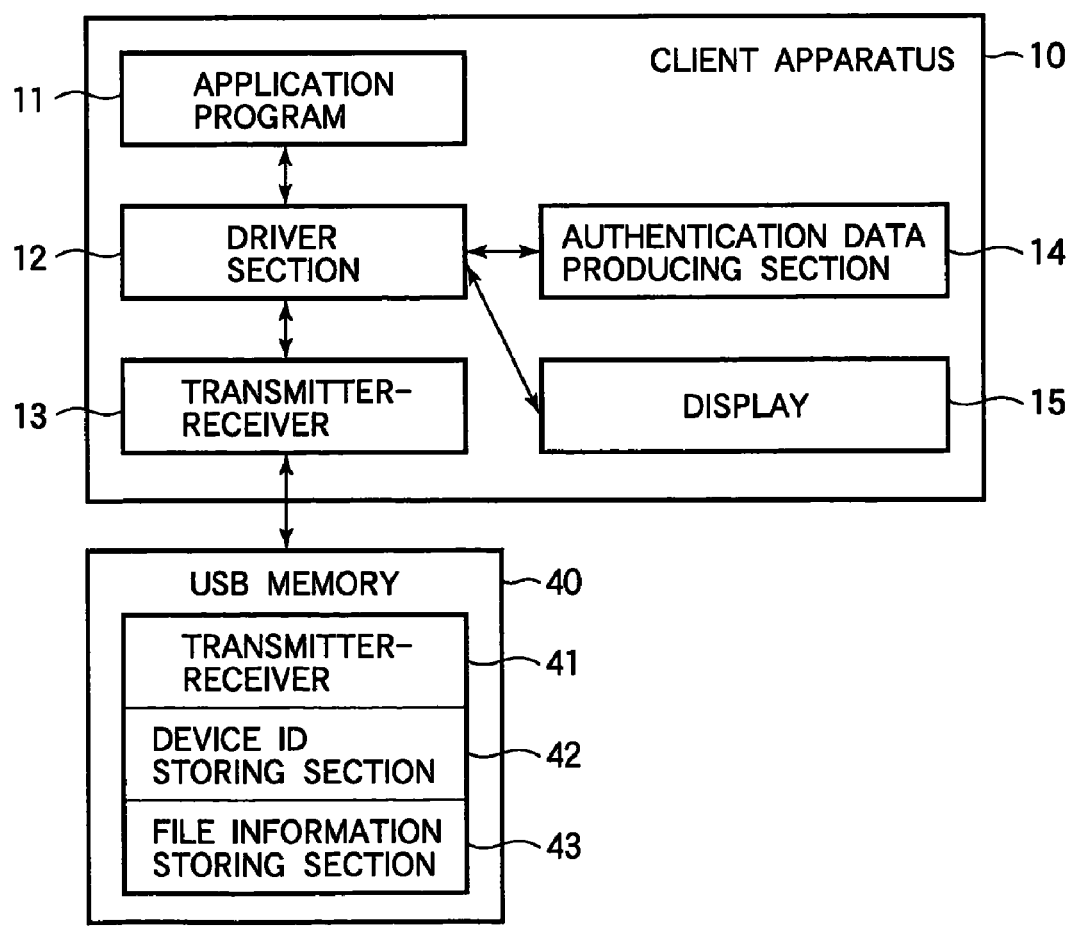
FIG. 2 is a block diagram illustrating the configuration of a client apparatus and a USB memory.
Figure 3:
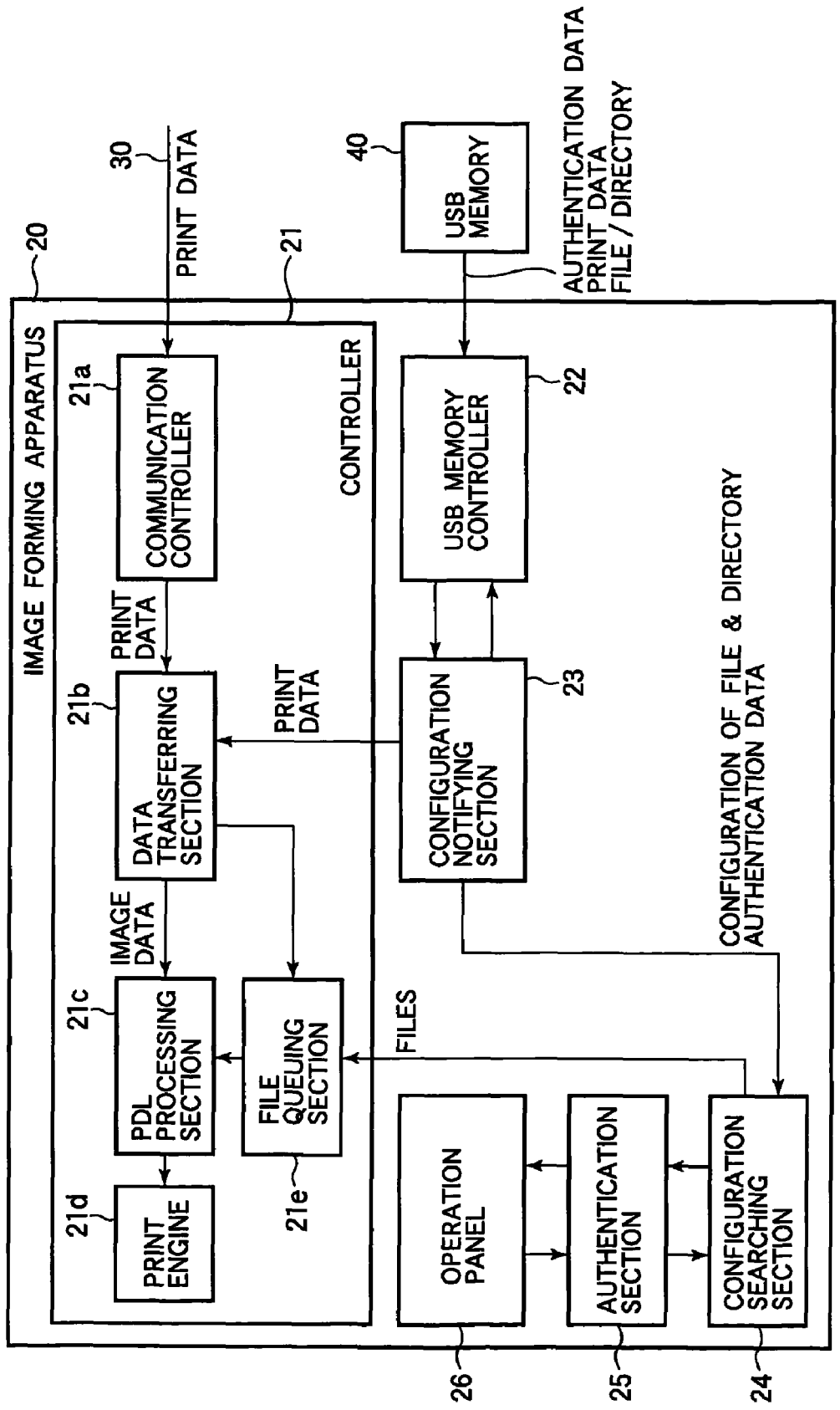
FIG. 3 is a block diagram illustrating the configuration of the image forming apparatus according to the first embodiment.
Figure 4:
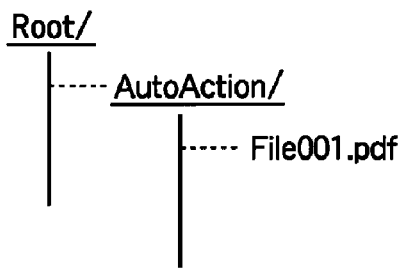
FIG. 4 illustrates the configuration of a directory and files in an initial state.

FIG. 2 is a block diagram illustrating the configuration of the client apparatus 10 and USB memory 40. FIG. 3 is a block diagram illustrating the configuration of the image forming apparatus 20 according to the first embodiment. FIG. 4 illustrates the configuration of a directory and files in an initial state.

Referring to FIG. 2, an application program 11 takes the form of an application program activated by a user. A driver section 12 functions under control of driver software that produces data to be printed in response to an instruction from the application program 11. A transmitter-receiver 13 transmits and receives data. An authentication data producing section 14 produces authentication data. A display 15 displays various items of information to the user. The driver section 12 produces an authentication data storing area in the USB memory 40, writes the authentication data into the authentication data storing area, and stores image data into the USB memory 40.

The USB memory 40 includes a transmitter-receiver 41 that transmits and receives data, a device ID storing section 42 that stores device ID information for identifying this USB memory 40, and a file information storing section 43 that stores file information representative of the configuration of directory and file. FIG. 4 illustrates an example of an initial configuration directory and file of the USB memory 40. Referring to FIG. 4, an "AutoAction" directory is below "Root" directory, and a file to be transmitted is listed below the "AutoAction" directory.

Referring to FIG. 3, the image forming apparatus 20 includes a controller 21. A communication controller 21a communicates with the client apparatus 10. A data transferring section 21b makes a decision to determine whether the received data is image data to be printed, and sends the image data to a page description language (PDL) processing section 21c. The PDL processing section 21c processes the image data received from the data transferring section 21b. A print engine 21d prints the data processed by the PDL processing section 21c. A file queuing section 21e queues the files that are received from the USB memory 40 and notified by the configuration searching section 24.

The image forming apparatus 20 also includes a USB memory controller 22, configuration notifying section 23, configuration searching section 24, authenticating section 25, and an operation panel 26.

The USB memory controller 22 controls a USB slot, not shown, and the USB memory 40, and receives authentication data, print data, and file/directory from the USB memory 40. The configuration notifying section 23 notifies the configuration searching section 24 of the information on the configuration of files and directories in the USB memory 40. The configuration searching section 24 receives image data and authentication data from the USB memory 40, and registers files-to-be-printed to the file queuing section 21e in accordance with the notification from the configuration notifying section 23. The authenticating section 25 compares authentication information received through the operation panel 26 with the authentication data read from the USB memory 40. The user inputs various items of information and commands into the operation panel 26 for operating the image forming apparatus 20.

{Operation of Image Forming System}

The operation of an image forming system of the aforementioned configuration will be described. The operation in which the user sends print data into the USB memory 40 will first be described.

Figure 5:
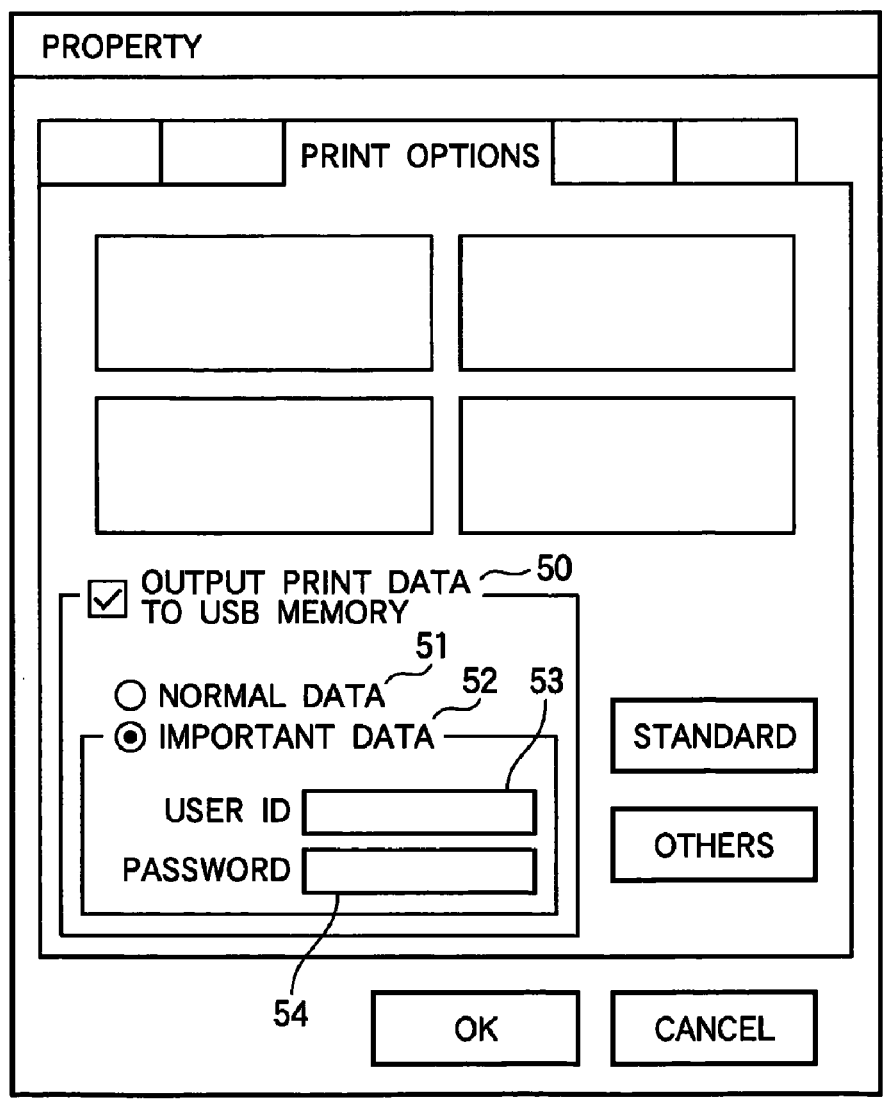
FIG. 5 illustrates an example of a display screen of the client apparatus according to the first embodiment.

Referring to FIG. 2, the user creates print data using an application program 11 in the client apparatus 10. When the user requests printing of the print data, a driver selection screen, not shown, appears on a display 15 of the client apparatus 10. When the user selects a desired driver on the display 15, the desired driver is expanded so that the user can selects one of print options. Upon selection of a desired print option, the selected option is displayed on the display 15 as shown in FIG. 5. If the print data is to be outputted to the USB memory 40, the user marks a checkbox 50.

FIG. 5 illustrates an example of a display screen of the client apparatus 10 according to the first embodiment.

If the print data created by the application program 11 is the normal data, the user marks a normal-data radio button 51. This completes the setting for the normal print data. If the print data created by the application program 11 is important data, the user marks an important-data radio button 52. When the radio button 52 is selected, the user inputs a user ID into a user ID box 53 and a password into a password box 54. This completes the setting for the important data. The radio buttons 51 and 52 are exclusive.

{Operation of Driver Section}

The operation in which the driver section 12 of the client apparatus 10 outputs the print data to the USB memory 40 will be described.

Figure 6:
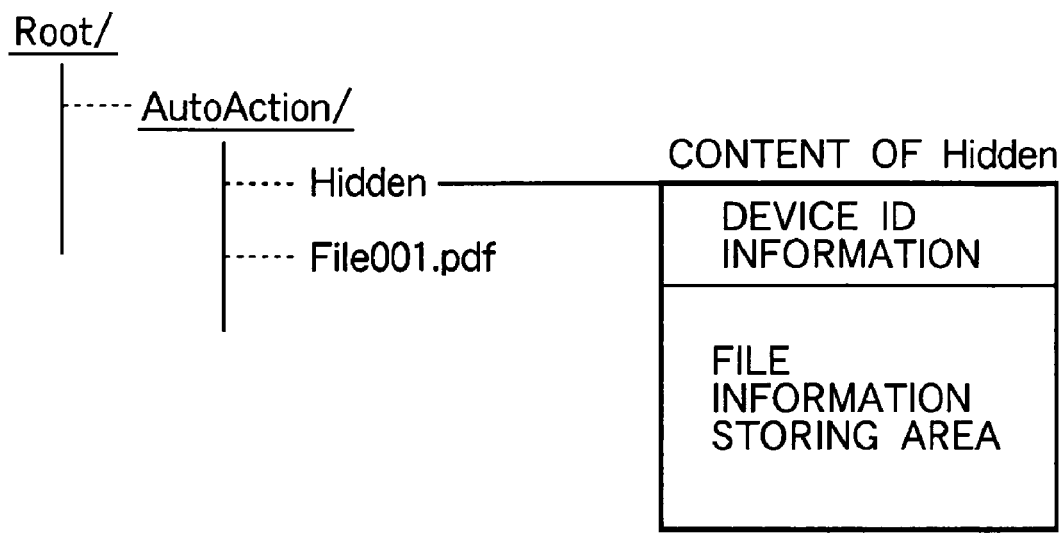
FIG. 6 illustrates the configuration of file and directory before mounting a Hidden of the USB memory according to the first embodiment.
Figure 7:
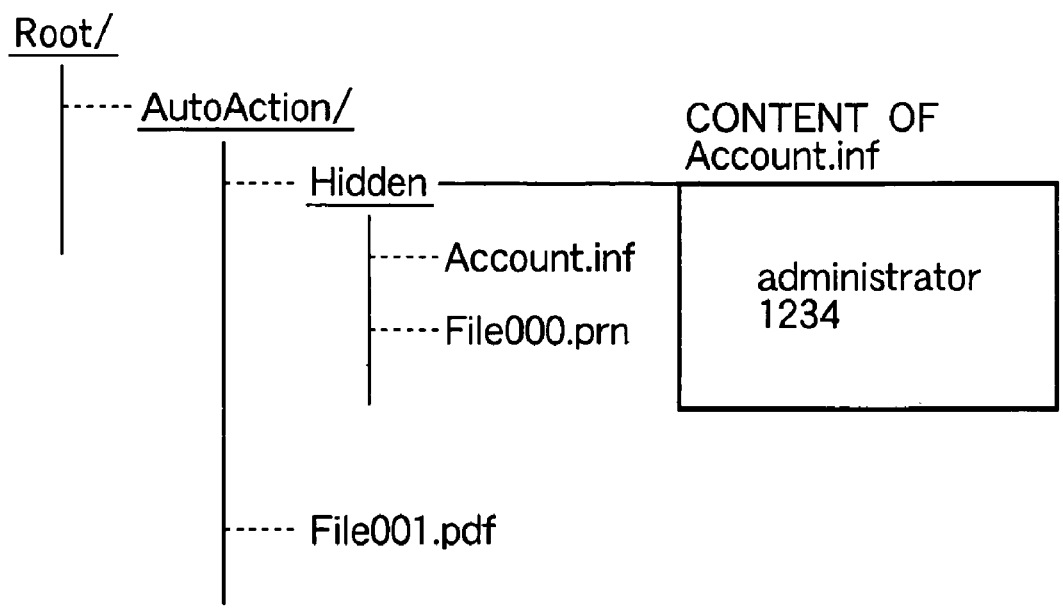
FIG. 7 illustrates the configuration of file and directory after mounting the Hidden of the USB memory.
Figure 8:
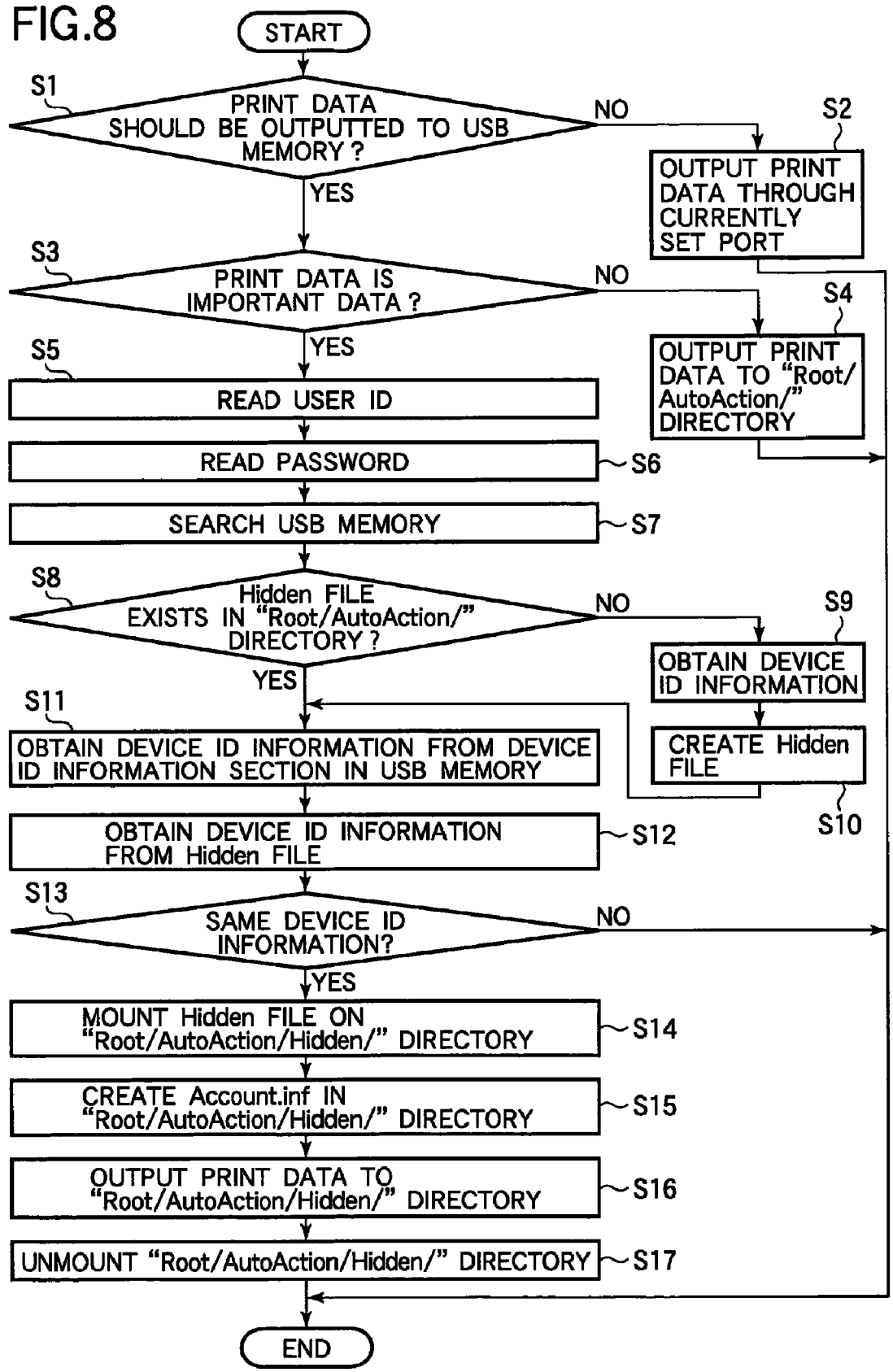
FIG. 8 is a flowchart illustrating the operation in which a driver section outputs print data.

FIG. 6 illustrates the configuration of file and directory before mounting a Hidden of the USB memory 40 according to the first embodiment. FIG. 7 illustrates the configuration of file and directory after mounting the Hidden of the USB memory 40. FIG. 8 is a flowchart illustrating the operation in which the driver section 12 outputs the print data.

The driver section 12 of the client apparatus 10 makes a decision to determine whether the print data should be outputted to the USB memory 40. If the print data should not be outputted to the USB memory 40, the print data is outputted from a currently set port, and then the process completes. Thus, the print data is transmitted to the image forming apparatus 20 via the communication line 30 connected to the port. If the print data should be outputted to the USB memory 40, the driver section 12 makes a decision to determine whether the print data is important data. If the print data is not important data, the print data is outputted to a "Root/AutoAction/" directory of the USB memory 40 in FIG. 4.

If the print data is important data, the driver section 12 reads a user ID, and then a password. The driver section 12 then searches the USB memory 40 to determine whether a hidden file is hidden in the "Root/AutoAction/" directory of the USB memory 40. This hidden file functions as an authentication data storing area. If a hidden file does not exist in the "Root/AutoAction/" directory, the driver section 12 creates a hidden file. The driver section 12 first obtains device ID information from a device ID information section 42 in the USB memory 40, and then creates a hidden file using the thus obtained device ID information. After the hidden file has been created, the configuration of file and directory in the USB memory 40 will look like that in FIG. 6.

The thus created hidden file is not automatically ready for use. The driver section 12 first obtains device ID information from the device ID information section 42 in the USB memory 40. Then, the driver section 12 obtains device ID information from the hidden file, and makes a decision to determine whether the two items of device ID information are the same. If the two items of device ID information are not the same, the hidden file may have been copied from other device. Therefore, the driver section 12 terminates the process without opening the hidden file.

If the two items of device ID information are the same, the driver section 12 performs the processing for mounting the hidden file, so that the hidden file can be identified to be the one below the "Root/AutoAction/Hidden/" directory. After the processing for mounting the hidden file has been performed, the configuration of file and directory of the USB memory 40 will look like that in FIG. 7.

Based on the user ID and password, the driver section 12 produces an Account.inf in the "Root/AutoAction/Hidden/" directory. The content of the Account.inf is shown in FIG. 7.

Then, the driver section 12 outputs the produced print data to the "Root/AutoAction/Hidden/" directory, which in turn stores the print data. Finally, the driver section 12 unmounts the "Root/AutoAction/Hidden/" directory, so that the print data is prevented from being used. In other words, the authentication data and print data are stored into the USB memory 40.

{Flowchart}

The flowchart in FIG. 8 will be described briefly.

Step S1: The driver section 12 makes a decision to determine whether the print data should be outputted to the USB memory 40. If the answer is YES, then the program proceeds to step S3. If the answer is NO, then the program proceeds to step S2.

Step S2: The print data is outputted through the currently set port, and then the process ends.

Step S3: The driver section 12 makes a decision to determine whether the print data is important data. If the answer is YES, the program proceeds to step S5. If the answer is NO, then the program proceeds to step S4.

Step S4: The print data is outputted to "Root/AutoAction/" directory, and the processing ends.

Step S5: The driver section 12 reads a user ID.

Step S6: The driver section 12 reads a password.

Step S7: The driver section 12 then searches the USB memory 40.

Step S8: The driver section 12 makes a decision to determine whether a hidden file exists in the "Root/AutoAction/" directory of the USB memory 40.

Step S9: The driver section 12 obtains device ID information from a device ID information section 42.

Step S10: The drive section 12 creates a hidden file.

Step S11: The driver section 12 obtains device ID information from the device ID information section 42 in the USB memory 40.

Step S12: The driver section 12 obtains device ID information from the hidden file.

Step S13: The driver section 12 makes a decision to determine whether the device ID information at step S11 and the device ID information at step S12 are the same. If the answer is NO, the program ends. If the answer is YES, the program proceeds to step S14.

Step S14: The driver section 12 performs the processing for mounting the hidden file on the "Root/AutoAction/Hidden/" directory.

Step S15: The driver section 12 creates the Account.inf in the "Root/AutoAction/Hidden/" directory.

Step S16: The print data is outputted to the "Root/AutoAction/Hidden/" directory.

Step S17: The driver section 12 performs the processing for unmounting the "Root/AutoAction/Hidden/" directory, and then the process ends.

{Operation for Attaching USB Memory to Image Forming Apparatus}

The operation in which the USB memory 40 is attached to the image forming apparatus 20 will be described.

Figure 9:
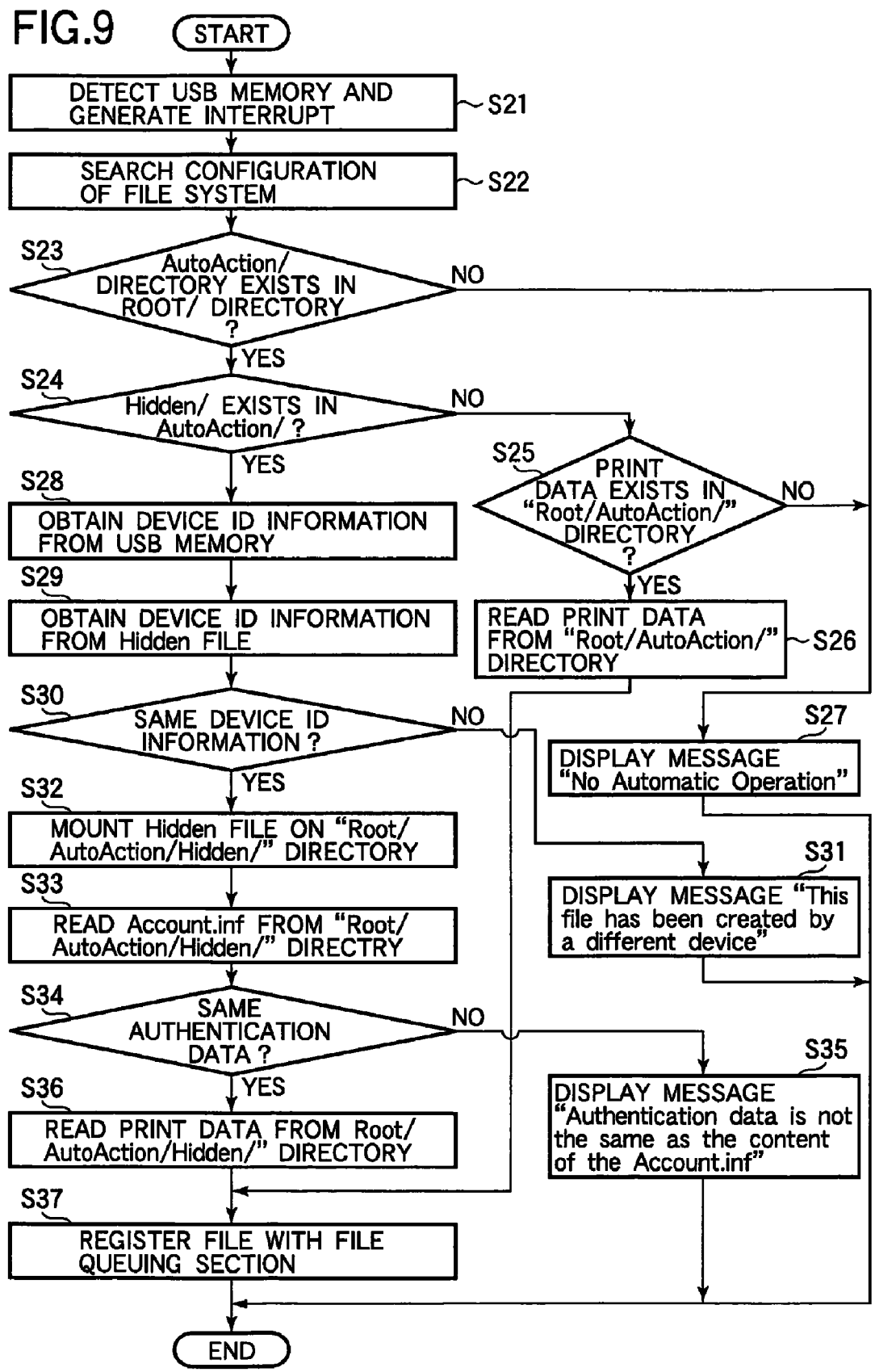
FIG. 9 is a flowchart illustrating the operation of the image forming apparatus when the USB memory is attached to the image forming apparatus.

FIG. 9 is a flowchart illustrating the operation of the image forming apparatus 20 when the USB memory 40 is attached to the image forming apparatus 20.

When the user connects the USB memory 40 to a USB slot, not shown, of the image forming apparatus 20, the USB memory controller 22 provides a notification of the detection of the USB memory 40 to the configuration notifying section 23. In other words, the USB controller 22 detects the attachment of a USB device to the image forming apparatus 20, and generates an interrupt to send a signal indicative of the detection of USB to the configuration notifying section 23. Then, the configuration searching section 24 of the image forming apparatus 20 searches the configuration of the file system in the USB memory 40, and then makes a decision to determined whether the AutoAction/ directory exists in the Root/ directory in the USB memory 40. In other words, a check is made to determine whether the AutoAction/ exists in the Root/ directory. If the AutoAction/ does not exist in the Root/ directory, the configuration searching section 24 controls the operation panel 26 to display an error message such as "No Automatic Operation," and then terminates the process.

If the AutoAction/ exists in the Root/, the image forming apparatus 20 makes a decision to determine whether the hidden directory exists in the AutoAction directory. In other words, a check is made to determine whether a Hidden/ exists in the AutoAction/.

If the Hidden/ does not exist in the AutoAction/, the image forming apparatus 20 makes a decision to determine whether print data exists in the AutoAction/. If the print data does not exist in the AutoAction/, the image forming apparatus 20 controls the operation panel 26 to display an error message such as "No Automatic Operation" as required, and then completes the process.

If the print data exists in the AutoAction/, the image forming apparatus 20 reads the print data from the AutoAction/. Then, the image forming apparatus 20 registers a file with the file queuing section 21e, and then completes the process.

If the Hidden/ exists in the AutoAction/, the image forming apparatus 20 obtains device ID information from the device ID information storing section 42 in the USB memory 40. Subsequently, the image forming apparatus 20 obtains device ID information from the hidden file. The image forming apparatus 20 makes a decision to determine whether the two items of device ID information are the same. If the two items of device ID information are not the same, the image forming apparatus 20 controls the operation panel 26 to display an error message such as "This file has been created by a different device," and then terminates the process.

If the two items of device ID information are the same, the image forming apparatus 20 performs the processing for mounting the hidden file, so that the hidden file can be identified to be the one below the "Root/AutoAction/Hidden/" directory. Subsequently, the image forming apparatus 20 reads the Account.inf from the Hidden/ after the processing for mounting the hidden file.

The image forming apparatus 20 makes a decision to determine whether the authentication data inputted through the operation panel 26 is the same as the content of the Account.inf. If the authentication data is not the same as the content of the Account.inf, the image forming apparatus 20 controls the operation panel 26 to display an error message such as "Authentication data is not the same as the content of the Account.inf," as required.

If the authentication data is the same as the content of the Account.inf, the image forming apparatus 20 reads the print data from the Hidden/, registers a file with the file queuing section 21e. This completes the process. The files that have been registered with the file queuing section 21e are on a queue, so that the files are printed in order.

{Flowchart}

The flowchart in FIG. 9 will be described briefly.

Step S21: The USB memory controller 22 detects when the USB memory 40 is attached to the image forming apparatus 20, and then generates an interrupt.

Step S22: The configuration searching section 24 searches the configuration in the file system.

Step S23: The configuration searching section 24 makes a decision to determine whether the AutoAction/ directory exists in the Root/ directory. If the answer is YES, the program proceeds to step S24. If the answer is NO, the program proceeds to step S27.

Step S24: The configuration searching section 24 makes a decision to determine whether the Hidden/ exists in the AutoAction/. If the answer is YES, the program proceeds to step S28. If the answer is NO, the program proceeds to step S25.

Step S25: The configuration searching section 24 makes a decision to determine whether print data exists in the "Root/AutoAction/" directory. If the answer is YES, the program proceeds to step S26. If the answer is NO, the program proceeds to step S27.

Step S26: The image forming apparatus 20 reads the print data from the "Root/AutoAction/" directory.

Step S27: The image forming apparatus 20 controls the operation panel 26 to display a message such as "No Automatic Operation," as required, and then terminates the process.

Step S28: The image forming apparatus 20 obtains device ID information from the device ID information storing section 42 in the USB memory 40.

Step S29: The driver section 12 obtains device ID information from the hidden file.

Step S30: A check is made to determine whether the two items of device ID information are the same. If the two items of device ID information are the same, the program proceeds to step S32. If the two items of device ID information are not the same, the program proceeds to step S31.

Step S31: The image forming apparatus 20 controls the operation panel 26 to display an error message such as "This file has been created by a different device", and then terminates the process.

Step S32: The driver section 12 mounts a Hidden file on the "Root/AutoAction/Hidden/" directory.

Step S33: The image forming apparatus 20 reads Account.inf from the "Root/AutoAction/Hidden/" directory.

Step S34: A check is made to determine whether the authentication data inputted through the operation panel 26 is the same as the content of the Account.inf. If the answer is YES, then the program proceeds to step S36. If the answer is NO, then the program proceeds to step S35.

Step S35: The image forming apparatus 20 controls the operation panel 26 to display a message such as "Authentication data is not the same as the content of the Account.inf," as required.

Step S36: The image forming apparatus 20 reads the print data from the "Root/AutoAction/Hidden/" directory.

Step S37: The image forming apparatus 20 registers a file with the file queuing section 21e.

As described above, when the user connects the USB memory 40 to the image forming apparatus 20 for printing the data in the USB memory 40, authentication is required. Therefore, the configuration of the embodiment effectively prevents unauthorized persons from printing the important, confidential data.

Because the authentication data and print data are managed separately, once the authentication data is produced, the same authentication data need not be produced for the next authentication.

Second Embodiment

Elements similar to those in the first embodiment have been given the same reference numerals and their description is omitted. The description of the operations and their advantages that are the same as those of the first embodiment has been omitted.

Figure 10:
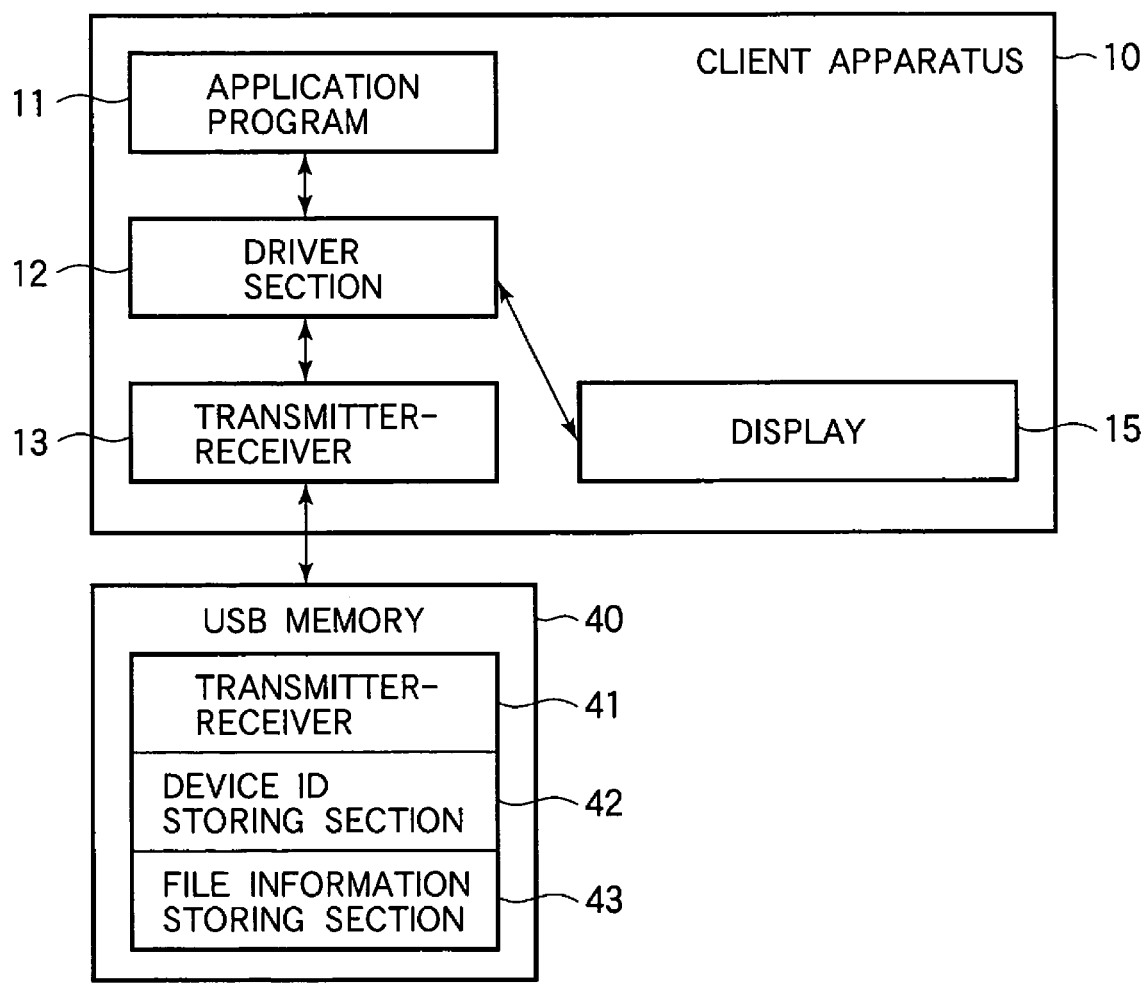
FIG. 10 is a block diagram illustrating the configuration of a client apparatus and a USB memory according to a second embodiment.

FIG. 10 is a block diagram illustrating the configuration of a client apparatus 10 and a USB memory 40 according to a second embodiment. Referring to FIG. 10, the client apparatus 10 does not include the authentication data producing section 14 of the first embodiment.

Figure 11:
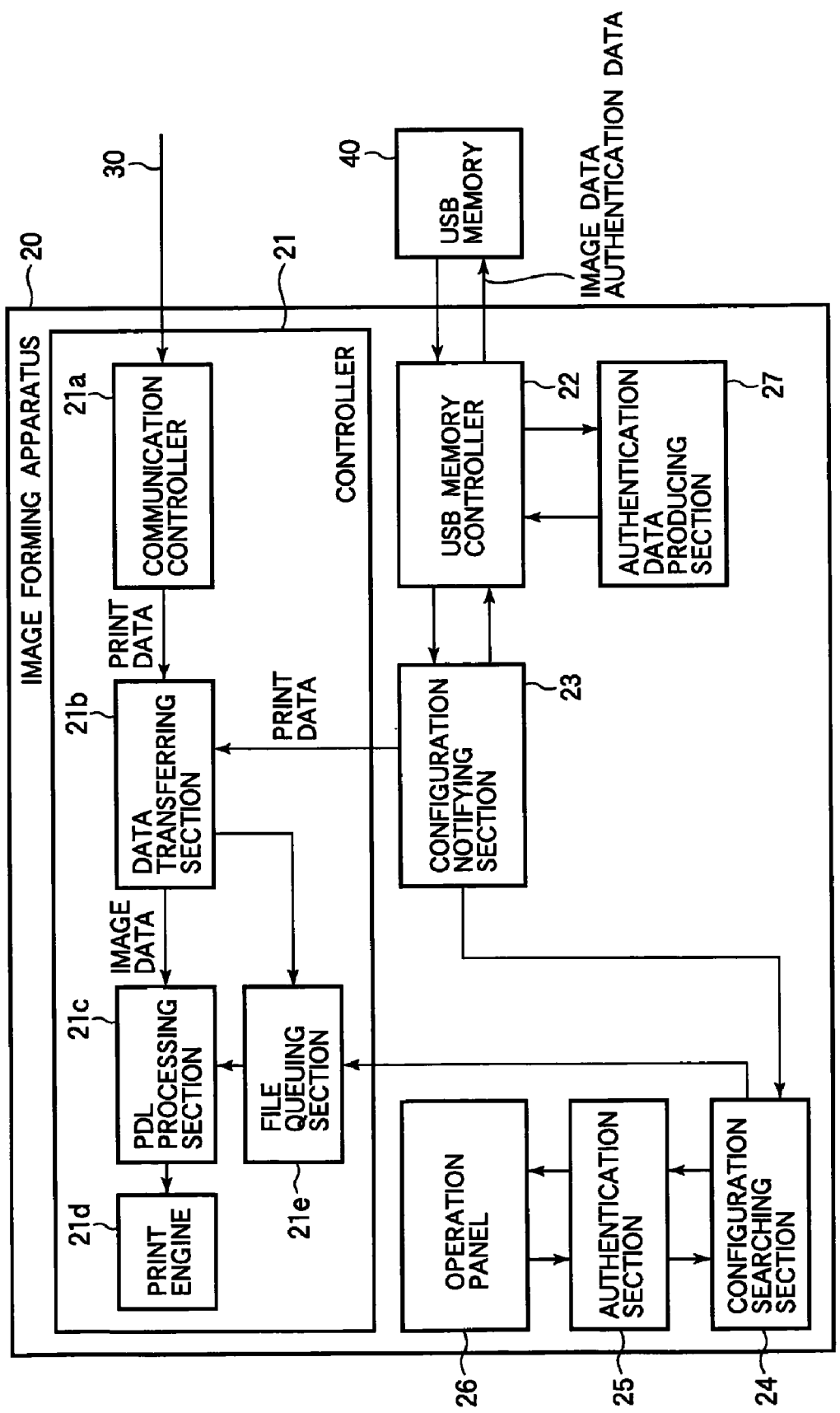
FIG. 11 is a block diagram illustrating the configuration of an image forming apparatus according to the second embodiment.

FIG. 11 is a block diagram illustrating the configuration of an image forming apparatus 20 according to the second embodiment.

Referring to FIG. 11, the image forming apparatus 20 includes an authentication data producing section 27 that produces authentication data. A USB memory controller 22 serves as an authentication data storing area defining means for defining an authentication data storing area in the USB memory 40, a writing means for writing authentication data into the authentication data storing area, and an image data storing means for storing image data into the USB memory 40. The USB memory controller 22 supplies data necessary for producing the authentication data to the authentication data producing section 27.

The authentication data producing section 27 produces the authentication data that contains device ID information unique to the image forming apparatus 20. The authentication data producing section 27 supplies the authentication data to the USB memory controller 22. This authentication data is then written into a USB memory 40 before the USB memory 10 is used for the first time. Thus, when the USB is attached to the image forming apparatus 20 at a later time, the USB memory 40 can be identified whether it is acceptable.

{Operation of Image Forming System}

The operation of the image forming system according to the second embodiment will be described.

When the USB memory 40 is used with the image forming apparatus 20 for the first time, a user has to first connect the USB memory 40 to the image forming apparatus 20, and then write authentication data into the USB memory 40. The operation in which the user writes the authentication data into the USB memory 40 will be described.

Figure 12:
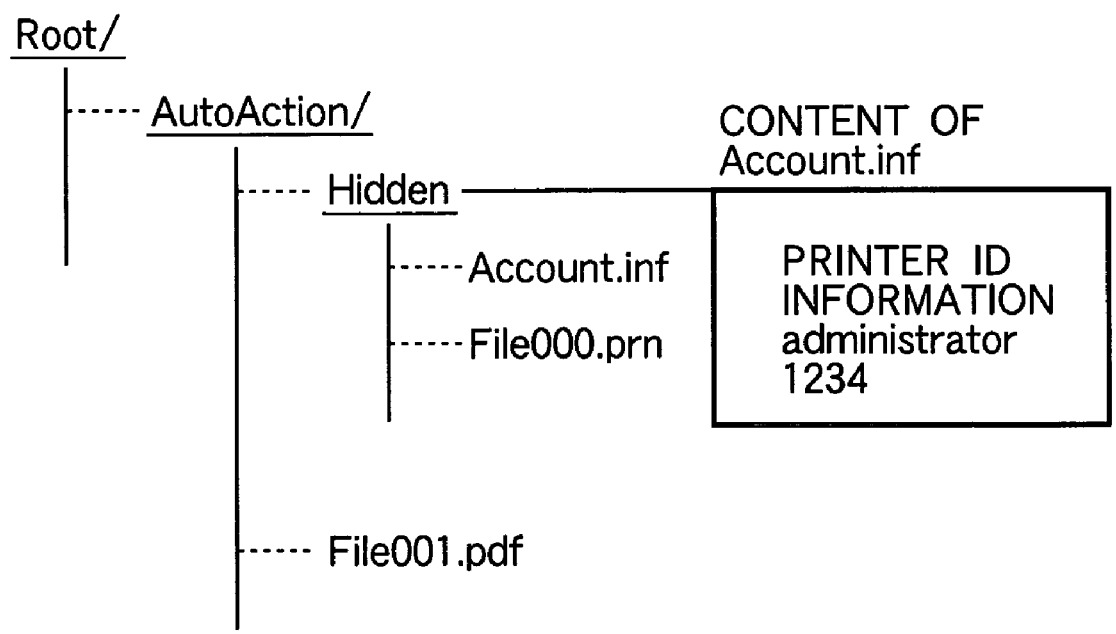
FIG. 12 illustrates the file configuration of the USB after a Hidden mounting processing.

FIG. 12 illustrates the file configuration of the USB after a Hidden mounting process. FIG. 13 is a flowchart illustrating the operation in which the image forming apparatus 20 produces authentication data.

Once the USB memory 40 has been attached to the image forming apparatus 20 and the USB memory 40 is ready to be written authentication data into it, the user inputs a user ID, and then a password through the operation panel 26. Then, the image forming apparatus 20 obtains a serial number of the image forming apparatus 20, and subsequently device ID information from a device ID information storing area 42 of the USB memory. The device ID information obtained from the device ID information storing area 42 is a serial number that identifies the USB memory, and is used when important data is created. This device ID information protects the important data such that even if someone copies the important data into another USB memory, the important data is prevented from being printed out from that USB memory. The image forming apparatus 20 then creates a Hidden file, and performs the Hidden mounting process for the Hidden file, so that the hidden file can be identified to be the one below a "Root/AutoAction/Hidden/" directory. After the Hidden mounting process has been performed, the configuration of the file and directory of the USB memory 40 will look like that in FIG. 12.

Subsequently, the image forming apparatus 20 creates the Account.inf below the "Root/AutoAction/Hidden/" directory, the Account.inf being based on the user ID and password inputted by the user, and the serial number of the image forming apparatus obtained. This serial number is identification information that identifies the image forming apparatus 20. FIG. 12 illustrates the content of the thus created Account.inf.

Then, the driver section 12 outputs the produced print data to the "Root/AutoAction/Hidden/" directory. Finally, the driver section 12 unmounts the "Root/AutoAction/Hidden/" directory, so that the print data is prevented from being used. This completes the process. In other words, the USB memory 40 now has its own authentication data.

{Flowchart}

The flowchart in FIG. 13 will be described briefly.

Step S41: The user inputs the user ID from the operation panel 26.

Step S42: The user inputs the password from the operation panel 26.

Step S43: The image forming apparatus 20 obtains a serial number of the image forming apparatus 20.

Step S44: The image forming apparatus 20 obtains device ID information from the device ID information storing area 42.

Step S45: The image forming apparatus 20 creates a Hidden file.

Step S46: The image forming apparatus 20 mounts the Hidden file on the "Root/AutoAction/Hidden/" directory.

Step S47: The image forming apparatus 20 creates an Account.inf below the "Root/AutoAction/Hidden/" directory.

Step S48: The driver section 12 outputs the produced print data to the "Root/AutoAction/Hidden/" directory.

Step S49: The driver section 12 unmounts the "Root/AutoAction/Hidden/" directory. This completes the process.

{Operation of Driver Section for Outputting Print Data to USB Memory}

FIG. 14 is a flowchart illustrating the operation in which the driver section 12 outputs print data to the USB memory 40 when the USB memory 40 has been connected to the client apparatus 10. The operation in FIG. 14 will be described.

The driver section 12 of the client apparatus 10 makes a decision to determine whether the print data should be outputted to the USB memory 40. If the print data should not be outputted, the print data is outputted through a currently set port and then the operation ends. Thus, the print data is transmitted via a communication line 30 currently connected to the port. If the print data should be outputted to the USB memory 40, the driver section 12 makes a decision to determine whether the print data is important or confidential. If the print data is not important data, the print data is stored into the "Root/AutoAction/" directory of the USB memory 40 as shown in FIG. 12, and the process ends.

If the print data is important data, the driver section 12 searches the USB memory 40 to determine whether a Hidden file exists in the "Root/AutoAction/" directory. If the Hidden file does not exist, the driver section 12 creates a Hidden file in which case the driver section 12 first obtains device ID information from the device ID information storing section 42 in the USB memory 40. Based on the thus obtained device ID information, the driver section 12 creates a Hidden file.

The thus created hidden file is not automatically ready for use. The driver section 12 first obtains the device ID information from the device ID information section 42 in the USB memory 40. Then, the driver section 12 obtains device ID information from the Hidden file, and makes a decision to determine whether the two items of device ID information are the same. If the two items of device ID information are not the same, the Hidden file may have been copied from other device, and therefore the driver section 12 terminates the process without opening the hidden file.

If the two items of device ID information are the same, the driver section 12 mounts the Hidden file on the Root/Auto-Action/Hidden/" directory, so that the hidden file can be identified to be the one below the "Root/AutoAction/Hidden/" directory.

Subsequently, the driver section 12 stores the thus produced print data into the "Root/AutoAction/Hidden/" directory. Finally, the driver section 12 unmounts the "Root/AutoAction/Hidden/" directory, so that the print data is prevented from being used. In other words, the authentication data and print data have been stored into the USB memory 40.

{Flowchart}

The flowchart will be described briefly.

Step S51: The driver section 12 makes a decision to determine whether the print data should be outputted to the USB memory 40. If the answer is YES, then the program proceeds to step S53. If the answer is NO, then the program proceeds to step S52.

Step S52: The print data is outputted through the currently set port, and then the process ends.

Step S53: The driver section 12 makes a decision to determine whether the print data is important data. If the answer is NO, then the program proceeds to step S54. If the answer is YES, the program proceeds to step S55.

Step S54: The driver section 12 outputs the print data to "Root/AutoAction/" directory, and then the processing ends.

Step S55: The driver section 12 searches the USB memory 40.

Step S56: A check is made to determine whether a Hidden file exists in the "Root/AutoAction/" directory. If the answer is NO, the program proceeds to step S57. If the answer is YES, the program proceeds to step S59.

Step S57: The driver section 12 obtains device ID information from the device ID information section 42 in the USB memory 40.

Step S58: The driver section 12 creates a Hidden file.

Step S59: The driver section 12 obtains device ID information of the USB memory 40.

Step S60: The driver section 12 obtains device ID information from the Hidden file.

Step S61: The driver section 12 makes a decision to determine whether the two items of device ID information are the same. If the answer is NO, the driver section 12 terminates the process. If the answer is YES, the program proceeds to step S62.

Step S62: The driver section 12 mounts the Hidden file on the Root/AutoAction/Hidden/" directory.

Step S63: The driver section 12 outputs the print data to the "Root/AutoAction/Hidden/" directory.

Step S64: The driver section 12 unmounts the "Root/AutoAction/Hidden/" directory, and then the program ends.

{Operation for Attaching USB Memory to Image forming Apparatus}

The operation in which the USB memory 40 is attached to the image forming apparatus 20 will be described.

FIG. 15 is a flowchart illustrating the operation of the image forming apparatus 20 when the USB memory 40 is connected to the image forming apparatus 20.

When the user inserts the USB memory 40 into a USB slot, not shown, of the image forming apparatus 20, the USB memory controller 22 provides a notification of the detection of the USB memory 40 to the configuration notifying section 23. In other words, the USB controller 22 detects the attachment of a USB device to the image forming apparatus 20, and generates an interrupt to send a signal indicative of the detection of USB to the configuration notifying section 23. Then, the configuration searching section 24 of the image forming apparatus 20 searches the internal configuration of the file system in the USB memory 40, and then makes a decision to determine whether the AutoAction/ directory exists in the Root/ directory. In other words, a check is made to determine whether the AutoAction/ exists in the Root/ directory. If the AutoAction/ does not exist in the Root/, the image forming apparatus 20 controls the operation panel 26 to display an error message such as "No Automatic Operation", and then terminates the process.

If the AutoAction/ exists in the Root/, the image forming apparatus 20 makes a decision to determine whether the Hidden directory exists in the AutoAction directory. In other words, a check is made to determine whether the Hidden/ exists in the AutoAction/.

If the Hidden/ does not exist in the AutoAction/, the image forming apparatus 20 makes a decision to determine whether print data exists in AutoAction/. If the print data does not exist in AutoAction/, the image forming apparatus 20 controls the operation panel 26 to display an error message such as "No Automatic Operation" as required, and then completes the process.

If the print data exists in the AutoAction/, the image forming apparatus 20 reads the print data from the AutoAction/. Then, the image forming apparatus 20 registers a file with the file queuing section 21*e*, and then completes the process.

If Hidden/ exists in AutoAction/, the image forming apparatus 20 obtains device ID information from the device ID information storing section 42 in the USB memory 40. Subsequently, the image forming apparatus 20 obtains device ID information from the hidden file. The image forming apparatus 20 makes a decision to determine whether the two items of device ID information are the same. If the two items of device ID information are not the same, the image forming apparatus 20 controls the operation panel 26 to display an error message such as "This file has been created by a different device", and then terminates the process.

If the two items of device ID information are the same, the image forming apparatus 20 performs the process for mounting the hidden file so that the hidden file can be identified to be the one below the "Root/AutoAction/Hidden/" directory. Subsequently, the image forming apparatus 20 reads the Account.inf from the Hidden/ after the process for mounting.

The image forming apparatus 20 makes a decision to determine whether a serial number of the image forming apparatus 20 and a serial number of the image forming apparatus stored in the Account.inf are the same. If the two serial numbers are not the same, the image forming apparatus 20 controls the operation panel 26 to display an error message such as "This printer is not allowed to print" as required, and then the program ends.

If the two serial numbers are the same, then the image forming apparatus 20 makes a decision to determine whether the authentication data inputted through the operation panel 26 and the content of the Account.inf are the same. If the authentication data and the content of the Account.inf are the same, then the image forming apparatus 20 controls the operation panel 26 to display an error message such as "Authentication data is not accepted," and the program ends.

If the authentication data and the content of the Account.inf are the same, the image forming apparatus 20 reads the print data from the Hidden/, and registers a file with the file queuing section 21e. Then, the process completes. The files that have been registered with the file queuing section 21e are on a queue, so that the files are printed in order.

{Flowchart}

The flowchart in FIG. 15 will be described briefly.

Step S71: The USB memory controller 22 detects when a USB is attached to the image forming apparatus 20, and then generates an interrupt.

Step S72: The configuration searching section 24 searches the configuration in the file system.

Step S73: The configuration searching section 24 makes a decision to determine whether AutoAction/ exists in the Root/. If the answer is YES, the program proceeds to step S74. If the answer is NO, the program proceeds to step S77.

Step S74: the image forming apparatus 20 makes a decision to determine whether the Hidden/ exists in the AutoAction. If the answer is YES, the program proceeds to step S78. If the answer is NO, the program proceeds to step S75.

Step S75: The image forming apparatus 20 makes a decision to determine whether print data exists in the "Root/AutoAction/" directory. If the answer is YES, the program proceeds to step S76. If the answer is NO, the program proceeds to step S77.

Step S76: The image forming apparatus 20 reads the print data from "Root/AutoAction/" directory.

Step S77: The image forming apparatus 20 controls the operation panel 26 to display an error message such as "No Automatic Operation" as required, and then terminates the process.

Step S78: The image forming apparatus 20 obtains device ID information from the device ID information storing section 42 in the USB memory 40.

Step S79: The driver section 12 obtains device ID information from the Hidden file.

Step S80: The image forming apparatus 20 makes a decision to determine whether the two items of device ID information are the same. If the answer is YES, the program proceeds to step S82. If the answer is NO, the program proceeds to step S81.

Step S81: The image forming apparatus 20 controls the operation panel 26 to display an error message such as "This file has been created by a different device", and terminates the process.

Step S82: The driver section 12 mounts a Hidden file on the "Root/AutoAction/Hidden/" directory.

Step S83: The image forming apparatus 20 reads the "Root/AutoAction/Hidden/Account.inf".

Step S84: The image forming apparatus 20 makes a decision to determine whether the serial numbers are the same. If the answer is YES, then the program proceeds to step S86. If the answer is NO, then the program proceeds to step S85.

Step S85: The image forming apparatus 20 controls the operation panel 26 to display an error message such as "The USB 40 is connected to non-acceptable printer" as required.

Step S86: The image forming apparatus 20 makes a decision to determine whether the authentication data and the content of the Account.inf are the same. If the answer is YES, then the program proceeds to steps S88. If the answer is NO, then the program proceeds to step S87.

Step S87: The image forming apparatus 20 controls the operation panel 26 to display an error message such as "Authentication data is not accepted" as required.

Step S88: The image forming apparatus 20 reads the print data from the Hidden/.

Step S89: The image forming apparatus 20 registers a file with the file queuing section 21e, and then the program ends.

In the second embodiment, only a limited printer(s) is allowed to print data. This facilitates management of image forming apparatus 20 by the administrator.

The first and second embodiments have been described in terms of the USB memory as an external storage medium. Other external storage media such as SD card, multi media card, compact Flash®, Memory Stick®, and Smart Media® may be used.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image forming apparatus, comprising:
   a searching section that reads image data and authentication data from a transportable external storage device detachably inserted into the image forming apparatus, wherein the transportable external storage device includes
      (i) a device ID information storing section that stores a first device ID value that identifies the transportable external storage device, and
      (ii) a file information storing section that stores the image data and the authentication data, the authentication data including a second device ID value and authentication information, wherein the second device ID value identifies a transportable external storage device into which the image data is originally stored, the second device ID value being stored into the file information storing section and being the same as the first device ID value when the image data is originally stored into the file information storing section; and
   an authenticating section that performs:
      (i) a first authentication to determine whether the first device ID value obtained from the transportable external storage device is the same as the second device ID value obtained from the transportable external storage device, and
      (ii) a second authentication by comparing the authentication information stored in the file information storing section of the transportable external storage device with authentication information received from a user from outside the image forming apparatus;
   wherein said searching section reads image data from the transportable external storage device only when the first authentication and the second authentication have been established.

2. The image forming apparatus according to claim 1, wherein the external storage device is a USB memory.

3. The image forming apparatus according to claim 1, further comprising an authentication data producing section, wherein said authentication data producing section produces the authentication data from identification information that identifies the image forming apparatus, and sends the authentication data produced from the identification information to the external storage device, the authentication data being written into the external storage device.

4. The image forming apparatus according to claim 1, wherein the image data is a file stored in a hidden file directory in the external storage device.

5. The image forming system according to claim 4, wherein the authentication data is read from the hidden file directory.

6. An image forming system comprising:
a client apparatus; and
an image forming apparatus;
said client apparatus comprising:
an authentication data storing area defining section that produces an authentication data storing area in a transportable external storage device detachably inserted into the client apparatus;
a writing section that writes authentication data into the authentication data storing area; and
an image data storing section that stores image data onto the transportable external storage device; and
said image forming apparatus comprising:
a searching section that reads the image data and the authentication data from the transportable external storage device, the transportable external storage device including a device ID information storing section that stores a first device ID value that identifies the transportable external storage device, the authentication data stored in the authentication data storing area including a second device ID value and authentication information, wherein the second device ID value identifies a transportable external storage device into which the image data is originally stored by the client apparatus, the second device ID value being stored into the authentication data storing area and being the same as the first device ID value when the image data is originally stored into the transportable external storage device; and
an authenticating section that performs:
(i) a first authentication to determine whether the first device ID value obtained from the transportable external storage device is the same as the second device ID value obtained from the transportable external storage device, and
(ii) if the first authentication has been established, a second authentication by comparing the authentication information stored in the authentication data storing area of the transportable external storage device with authentication information received from a user from outside the image forming apparatus;
wherein said searching section reads the image data from the transportable external storage device only when the second authentication has been established.

7. The image forming system according to claim 3, wherein the external storage device includes a hidden file directory that stores a hidden file that contains the image data therein.

8. An image forming apparatus comprising:
an authentication data storing area defining section that defines an authentication data storing area in a transportable external storage device detachably inserted into the image forming apparatus;
a writing section that writes authentication data into the authentication data storing area;
a searching section that reads image data and authentication data from the transportable external storage device, the transportable external storage device including
(i) a device ID information section that stores a first device ID value that identifies the transportable external storage device, and
(ii) a file information storing section that stores image data and includes the authentication data storing area, the authentication data including a second device ID value and authentication information, wherein the second device ID value identifies a transportable external storage device into which the image data is originally stored, the second device ID value being stored into the authentication data storing area and being the same as the first device ID value when the image data is originally stored into the file information storing section; and
an authenticating section that performs:
(i) a first authentication to determine whether the first device ID value obtained from the transportable external storage device is the same as the second device ID value obtained from the transportable external storage device, and
(ii) only if the first authentication has been established, a second authentication by comparing the authentication information stored in the authentication data storing area of the transportable external storage device with authentication information received from a user from outside the image forming apparatus;
wherein said searching section reads the image data from the transportable external storage device only when the second authentication has been established.

9. The image forming apparatus according to claim 1, wherein the image forming apparatus further comprises an operation panel through which the user inputs the authentication information;
wherein after the first authentication has been established, said authenticating section performs the second authentication based on the authentication information received through said operation panel.

10. The image forming apparatus according to claim 9, wherein said operation panel displays an error message if the first authentication fails.

11. The image forming apparatus according to claim 9, further comprising an authentication data producing section that produces the authentication data from the second item of device identification information that identifies the image forming apparatus and that is stored in the image forming apparatus, said authentication data producing section sending the authentication data to the external storage device so that the authentication data is written into the external storage device.

12. The image forming apparatus according to claim 1, further comprising:
an operation panel through which a user inputs the authentication information, the authentication information including a user ID and password.

13. The image forming apparatus according to claim 1, wherein the second authentication is performed after the first authentication has been established.

14. The image forming apparatus according to claim 1, wherein the authentication information is read after the first authentication has been established.

15. The image forming apparatus according to claim 14, wherein the authentication information includes a first serial number of the image forming apparatus and a first password, wherein the authenticating section performs the first authentication based on comparing the first serial number read from the transportable external storage device with a second serial number previously stored in the image forming apparatus, and the second authentication based on comparing the first password read from the transportable external storage device with a second password received through the operation panel.

* * * * *